(12) United States Patent  (10) Patent No.: US 8,172,292 B1
Andersen  (45) Date of Patent: May 8, 2012

(54) ARM TOOL FOR PACKING TRAYS IN BOXES

(75) Inventor: Allan Andersen, Johnston, IA (US)

(73) Assignee: SACMI USA, Ltd., Des Moines, IA (US)

( * ) Notice: Subject to any disclaimer, the term of this patent is extended or adjusted under 35 U.S.C. 154(b) by 351 days.

(21) Appl. No.: 12/590,233

(22) Filed: Nov. 4, 2009

(51) Int. Cl.
*B25J 15/08* (2006.01)

(52) U.S. Cl. .............................. 294/207; 294/2; 294/86.4

(58) Field of Classification Search ............. 294/2, 67.4, 294/81.62, 86.4, 87.12, 119.1, 207; 414/496.9, 414/736, 796.9; 901/37, 39
See application file for complete search history.

(56) References Cited

U.S. PATENT DOCUMENTS

| | | | | |
|---|---|---|---|---|
| 3,983,926 A | * | 10/1976 | Muller | 164/386 |
| 4,293,272 A | * | 10/1981 | Jellema | 414/744.5 |
| 4,355,936 A | | 10/1982 | Thomas et al. | |
| 4,583,902 A | * | 4/1986 | Riley | 414/261 |
| 4,616,971 A | * | 10/1986 | Matrone | 414/730 |
| 4,911,608 A | * | 3/1990 | Krappitz et al. | 414/796 |
| 5,380,147 A | * | 1/1995 | Hess et al. | 414/796 |
| 5,709,524 A | * | 1/1998 | Tacchi et al. | 414/796.9 |
| 7,887,108 B1 | * | 2/2011 | Cawley et al. | 294/2 |

* cited by examiner

*Primary Examiner* — Dean Kramer
(74) *Attorney, Agent, or Firm* — G. Brian Pingel; Camille L. Urban

(57) ABSTRACT

An end of arm tool for packing article bearing trays in boxes includes a pair of spaced apart clamping end members and a pair of cylinder assemblies each including a powered cylinder for causing the end members to move from an extended position to a semi-retracted position for picking up trays and then moving to a fully retracted position to cause the tray to bend for placing the tray in a box.

8 Claims, 11 Drawing Sheets

ARM TOOL FOR PACKING TRAYS IN BOXES

CROSS-REFERENCE TO RELATED APPLICATIONS

None

BACKGROUND OF THE INVENTION

1. Field of the Invention

The present invention relates to an end of arm tool which may be mounted on an industrial articulating robot for the purpose of handling a variety of different types of article bearing trays for placing the trays in a packing box 2. Description of the Prior Art A variety of different types of end of arm tools have been developed for picking up packages or trays to move them from one position to another. For example, U.S. Pat. No. 4,355,936 issued to Thomas et al. discloses an end of arm tool for transferring trays of eggs onto a conveyor. Although the tool disclosed in the Thomas et al. patent appears to provide a workable and efficient transfer device for egg trays, it does not have the capability for transferring the trays into a packing box for shipment through distribution channels.

The present invention provides a highly efficient end of arm tool that is designed for picking up trays holding various types of articles, but not limited to, such as vegetables, apples or other fruit and placing the trays in a packing box.

SUMMARY OF THE INVENTION

The present invention provides an end of arm tool for packing article bearing trays in boxes and includes a pair of spaced apart clamping end members and a pair of cylinder assemblies each secured to one of the end members and including a powered cylinder apparatus for causing said end members to move from an extended position to a semi-retracted position for picking up a tray and then moving to a fully retracted position to cause the tray to bend for placing it in a box.

Each of the clamping end members includes an end plate having a lower portion slanted inwardly, at least one powered cylinder mounted on the end plate and at least one finger member mounted on said cylinder and vertically movable thereby from an open position to a closed position adjacent the lower portion of the end plate to clamp one end of said tray therebetween. In a preferred embodiment each of the end members includes at least two spaced apart power cylinders mounted on the end plate and having a finger member attached to each of the cylinders. Additionally, the end members further include a medial powered cylinder located between the spaced apart cylinders and a pair of fingers attached to said medial cylinder.

Each of the cylinder assemblies is formed of at least one bearing block having at least one longitudinal bore extending therethrough, an extender rod journaled in said bore and having an outer end secured to one of said end members and an inner end, a back plate secured to the inner end of said extender rod, and said powered cylinder apparatus is connected to said back plate and said bearing block so that when the cylinder apparatus is extended, its associated end member is caused to retract.

Other features and advantages of the present invention will be readily appreciated from the following description. The description makes reference to the accompanying drawings, which are provided for illustration of the preferred embodiment. However, such embodiment does not represent the full scope of the invention. The subject matter which the inventor regards as his invention is particularly pointed out and distinctly claimed in the claims at the conclusion of this specification.

DETAILED DESCRIPTION OF THE PREFERRED EMBODIMENT

While the making and using of a preferred embodiment of the end of arm tool of the present invention are discussed in detail below, it should be appreciated that the invention provides for inventive concepts capable of being embodied in a variety of specific context. This specific embodiment discussed herein is merely illustrative of specific manners in which to make and use the invention and is not to be interpreted as limiting the scope of the present invention.

Figure 1:
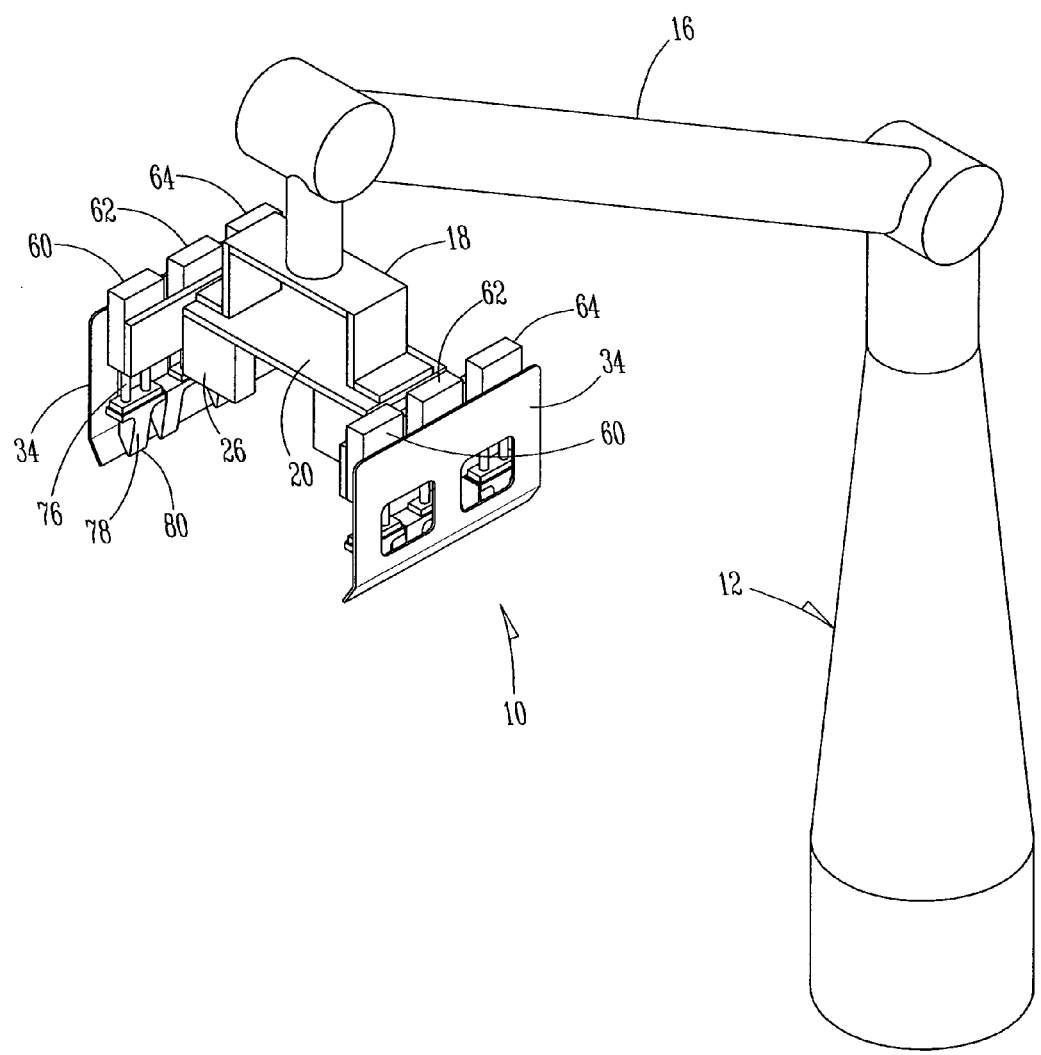
FIG. 1 is a diagrammatic perspective view of a typical articulated robot with the end of arm tool of the present invention mounted thereon.

Referring now to the drawings and with reference first to FIG. 1, a preferred embodiment of an end of arm tool of the present invention is shown at 10 that is held in position by an articulated robot 12. The end of arm tool 10 is computer controlled as is well-known in the art and is particularly adapted for picking up packing trays 14 from a conveyor 15 (see FIGS. 6-11) holding different types of articles such as vegetables or fruit. The trays 14 are typically formed from a unitary sheet molded to final shape from fibers, pulp materials or plastic such as thermal plastic, either injection molded or vacuum form extruded or form sheets, all according to known techniques. The trays 14 are shaped to define a plurality of receiving pockets (not shown) arranged in parallel rows and designed for receipt of fragile or crushable articles.

As shown in FIG. 1, the tool 10 is mounted on the outer end of an arm 16 of the robot 12 by means of a frame structure 18 that is secured at either side to a horizontally aligned support plate 20 that serves as a platform to which the operational portions of the tool 10 are mounted.

Figure 2:
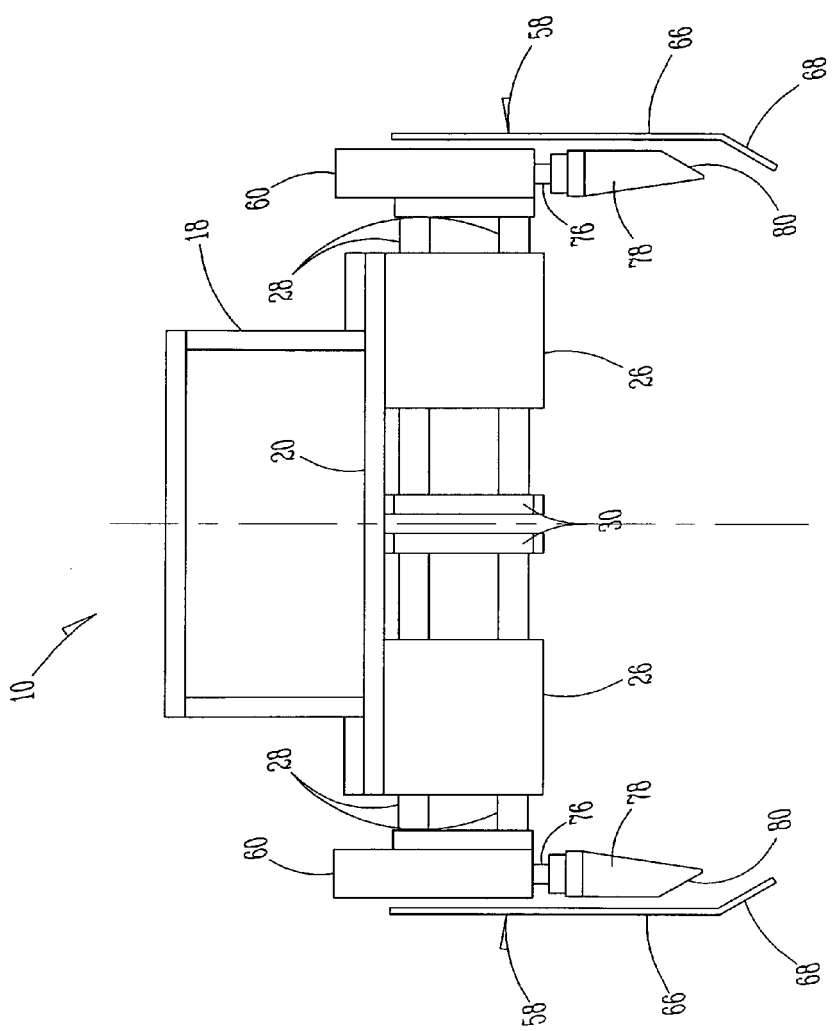
FIG. 2 is a front view of a preferred embodiment of the end of arm tool of the present invention.
Figure 4:
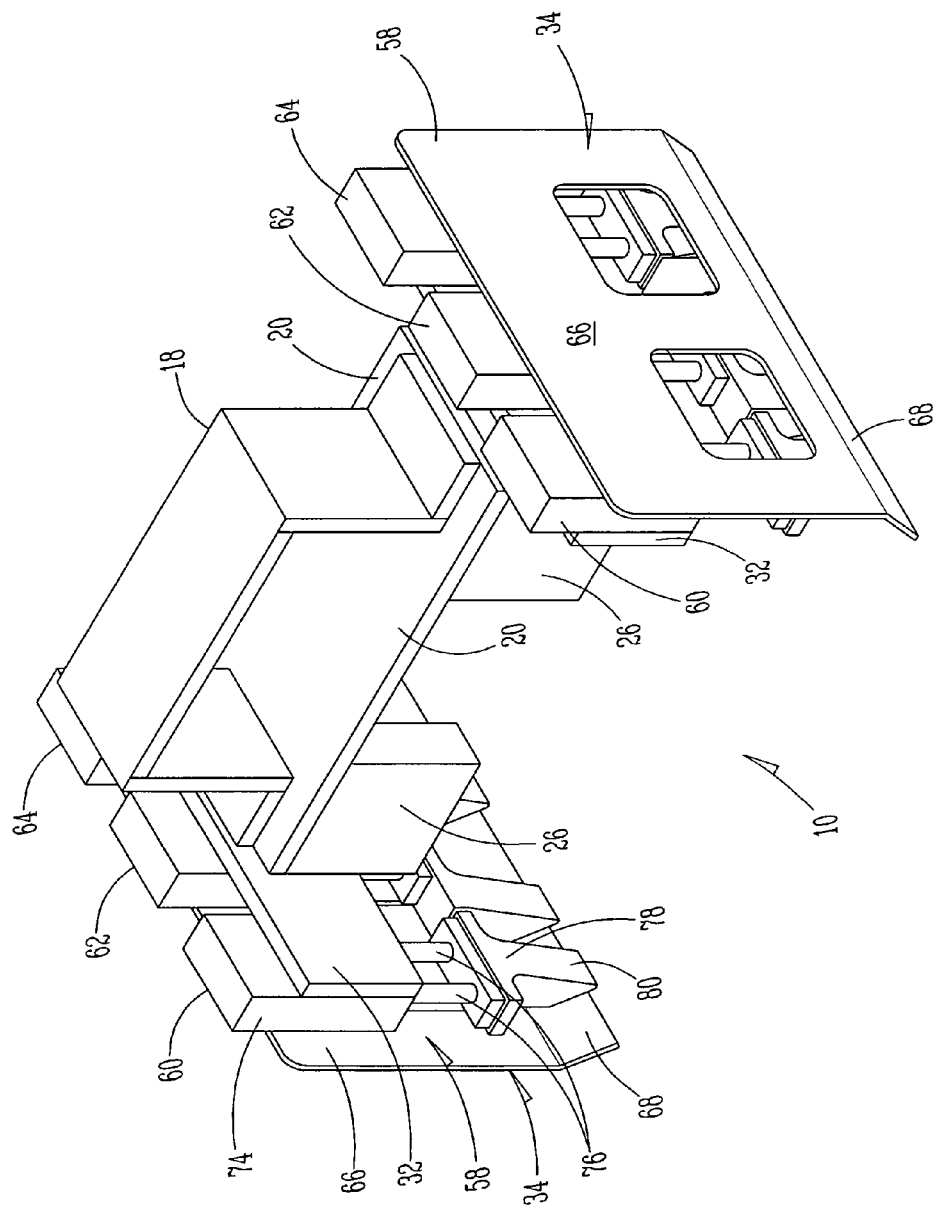
FIG. 4 is a rear perspective view of the end of arm tool of FIG. 1.
Figure 5:
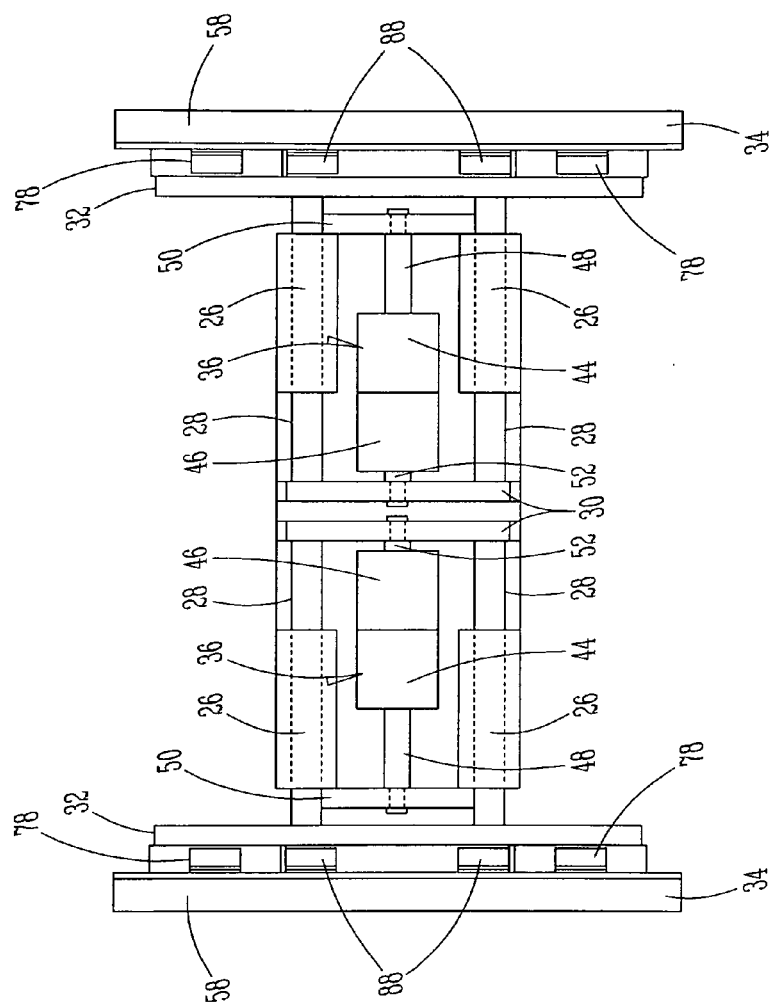
FIG. 5 is a bottom view of the end of arm tool shown in FIG. 2.

Referring now to FIGS. 2, 4 and 5, secured to the bottom of the support plate 20 are two pairs of bearing blocks 26. As best shown in FIG. 5, the pairs of bearing blocks 26 are mounted on opposite ends of the support plate 20 and are spaced apart from one another. Each of the bearing blocks 26 is adapted to serve for journaling a pair of extender rods 28 having inner ends secured to a transfer plate 30 and outer ends secured to an attachment plate 32 of a clamping end member 34.

Also secured to the bottom of the support plate 20 interposed between each of the pairs of bearing blocks 26 are preferably pneumatically controlled powered cylinder assemblies 36 that are employed for extending and retracting each of the clamping end members 34 during operation of the tool 10. With continued reference to FIG. 5, each of the cylinder assemblies 36 is formed of powered cylinders 44 and 46 arranged in a back to back relationship.

A rod end 48 of each of the cylinders 44 is attached to a securement plate 50 mounted on the outer ends of the bearing blocks 26 and a rod end 52 of each of the cylinders 46 is attached to one of the transfer plates 30. Thus, when the cylinder assemblies 36 are extended or retracted, they cause the clamping end members 34 to extend or retract in a corresponding manner due to the linkage therebetween provided by the transfer plates 30, the extender rods 28 and the attachment plates 32. As a result of the back to back arrangement of the cylinders 44 and 46, the extension or retraction of the end members 34 is performed in a two stage manner as the cylinders 44 and 46 are actuated in a sequential fashion with the cylinders 46 actuated first and the cylinders 44 being actuated second for a purpose to be described below.

Figure 3:
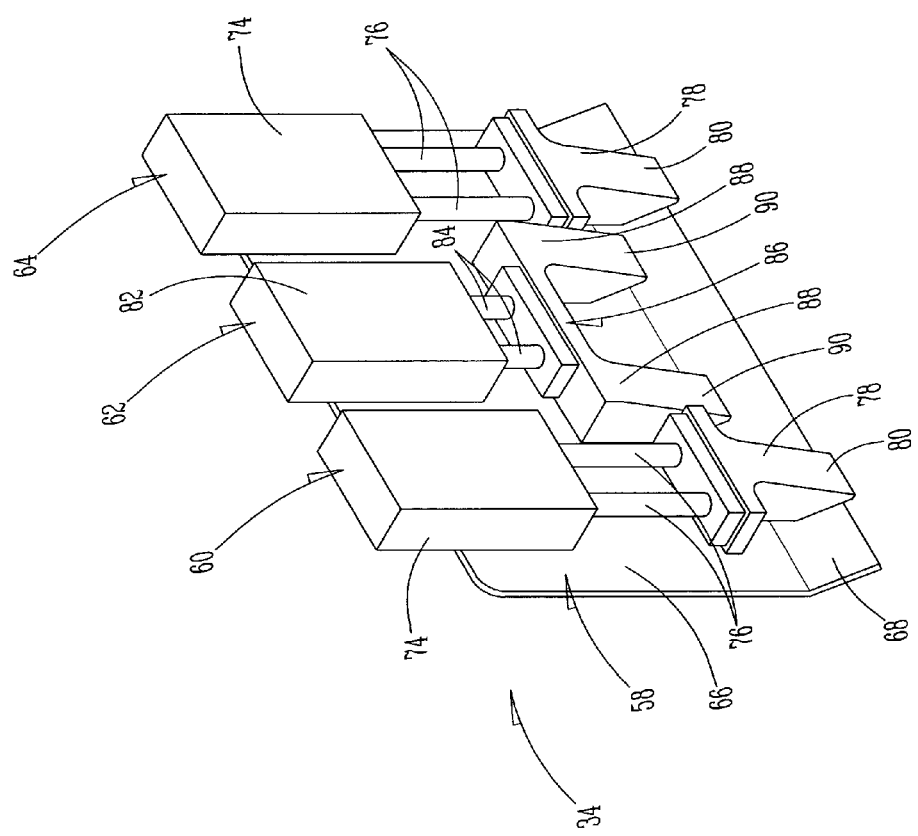
FIG. 3 is a side perspective view of a portion of the end of arm tool shown in FIG. 2 showing a clamping end member of the present invention that is utilized for grasping one end of a tray.

As shown best in FIG. 3, each of the clamping end members 34 is formed of a clamping plate 58 that is positioned perpendicular to the longitudinal axis of the trays 14, and preferably includes three clamping finger assemblies 60, 62 and 64 secured on the plate 58 in a parallel relationship thereto. The clamping plate 58 is formed of a major upper portion 66 and a relatively narrow lower portion 68 that is bent inwardly at approximately a 45 degree angle with respect to the portion 66 to be able to coact with the trays 14, but may be formed at a different angle if used with different types of trays.

The finger assemblies 60 and 64 are mounted on opposite ends of the clamping plate 58 and are essentially identical to one another in that they each contain a powered cylinder 74 having two rod ends 76 that are each attached to a clamping finger 78. Preferably the clamping plate 58 is formed of metal and the clamping fingers 78 are made of aluminum and are hard coated to ensure they stay sharp.

As can best be seen in FIG. 2, the clamping fingers 78 have a lower end 80 that has a shape that is angled corresponding to the angle of the clamping plate lower end 68. Thus, when the finger assemblies 60 and 64 are extended downwardly from their normal at rest position, shown in FIG. 2, to a tray engaging position as shown in FIG. 1, the clamping fingers 78 and the lower portion 68 of the plate 58 can be brought together for clamping the edges of a tray 14 therebetween. Accordingly by use of the clamping members 34, the opposite edges of a tray 14 can be engaged for the purpose of lifting the tray.

It should be noted that the location of the fingers 78 in grasping the trays 14 is critical for proper operation of the tool 10. As is well-known in the art, trays such as the tray 14 come in various configurations, but essentially the most common configurations are formed of parallel lines of recesses in the trays that are alternately positioned in a staggered manner as indicated by FIGS. 6-11. For example, the tray 14 has five rows of recesses and is fashioned so that the recesses of the two outer rows and the middle row are closer to the edges of the tray 14 than are the rows of recesses therebetween to reduce contact between the apples contained therein. In contrast, in an alternative tray configuration the arrangement of the rows of recesses is reversed. Frequently, in packing a box it is preferable to use both types of trays in an alternating sequence. In this way, no apples in the box are positioned directly over another apple so that there is less of a likelihood that apple bruising will occur.

Thus, for engaging one of the trays 14, only the cylinder assemblies 60 and 64 are utilized. However for trays that do not have the same recess configuration as a tray 14, such as the alternative configuration, cylinder assemblies 60 and 64 cannot be utilized as the fingers will interfere with the apples sitting in the tray. That is why each of the clamping end members 34 preferably include one of the cylinder assemblies 62, which is adapted for picking up trays with the alternative configuration.

The cylinder assembly 62 is basically a combination of the assemblies 60 and 64. As can best be seen in FIG. 3, the assembly 62 includes a powered cylinder 82 and a pair of cylinder rod ends 84 that are secured to a clamping finger structure 86 that includes two clamping fingers 88. Similar to the structure of the clamping fingers 78, the clamping fingers 88 each have a lower portion 90 similar in configuration to the lower portion 80 of the clamping fingers 78 in order that the cylinder assembly 62 can be used for picking up trays when the alternate form of tray is used in connection with the tool 10. In this way, the tool 10 is designed to either pick up one of trays 14, or one of the alternative form trays depending on the type of tray to be picked up.

To determine the type of tray that is presented to the tool 10, a sensing device 96 that can detect the arrangement of the apples in the tray is associated with the conveyor 15. The sensing device 96 then provides a control signal to the tool 10 to cause either the cylinder assemblies 60 and 64 to be actuated or to cause the cylinder assembly 62 to be actuated depending upon the type of tray detected. The particular type of sensing means 96 that is utilized in connection with the tool 10 is not critical and a wide variety of different types of sensing means or sensing methods can be employed for determining the type of tray to be picked up.

Keeping the foregoing description of components of the tool 10 in mind, the operation of the tool in grasping and picking up a tray 14 loaded with apples will now be described with reference to FIGS. 6-11.

Figure 6:
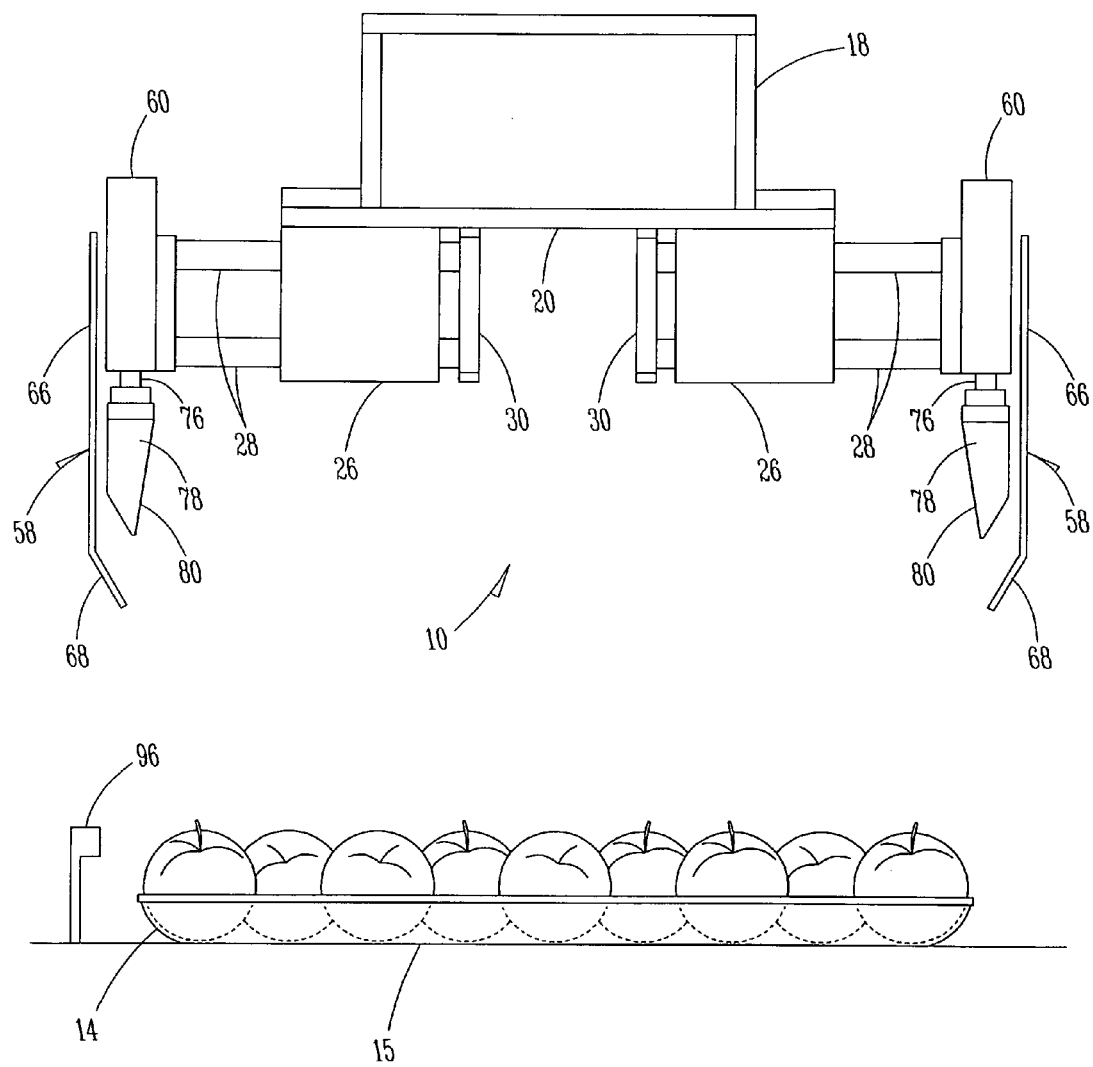
FIG. 6 is a diagrammatic view of the end of arm tool of the present invention shown in an at rest position over a tray of apples sitting on a conveyor; and with the tray bottom cut away.

Referring first to FIG. 6, the end of arm tool 10 is shown located in a standby position above one of the trays 14 that is loaded with apples and sitting on the conveyor 15 for bringing loaded apple trays into a position for being picked up by the tool 10. Preferably, the conveyor is operated in a continuously running condition at a speed of ninety feet per minute which corresponds to a cycle time of twenty trays per minute being handled by the tool 10. Although not shown in FIG. 6 or the remaining FIGS. 7-11, the tool 10 would, of course, be supported in its standby position by the robot 12.

Figure 7:
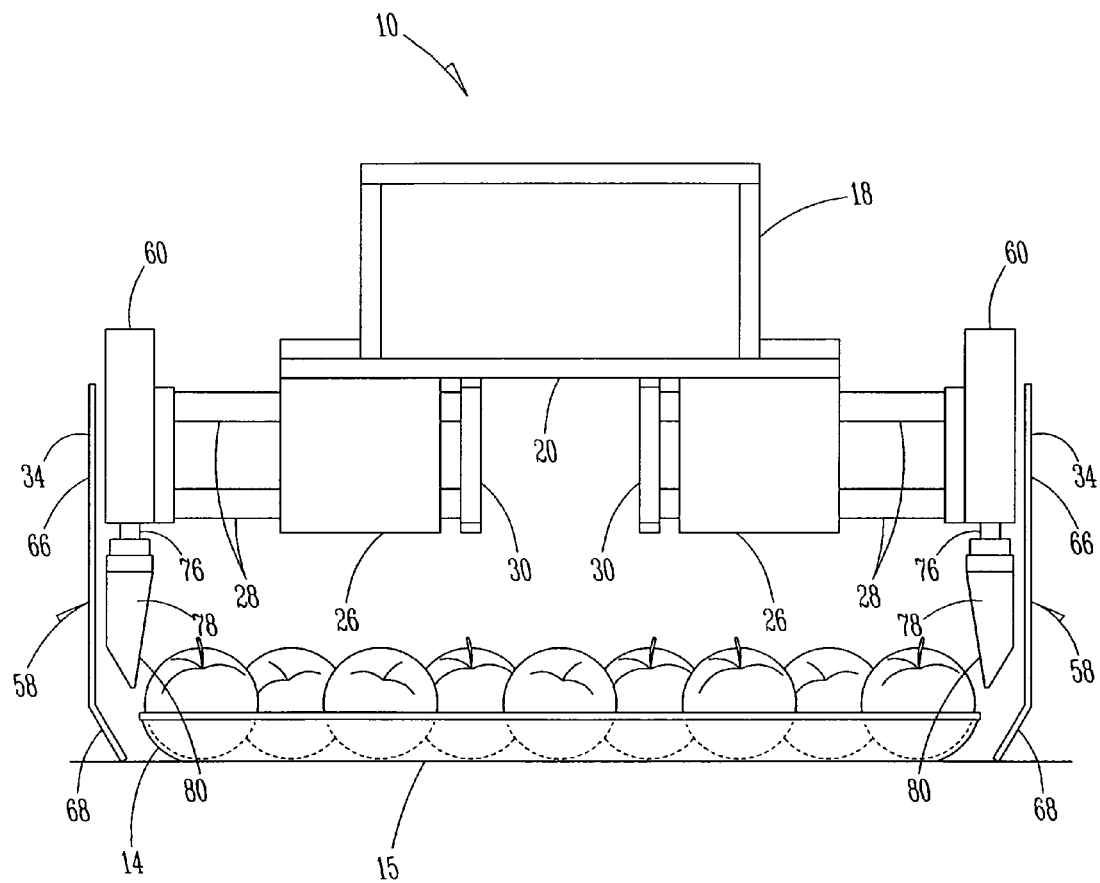
FIG. 7 is a diagrammatic view showing the end of arm tool of FIG. 6 shown in a position to grasp the tray of FIG. 6.
Figure 8:
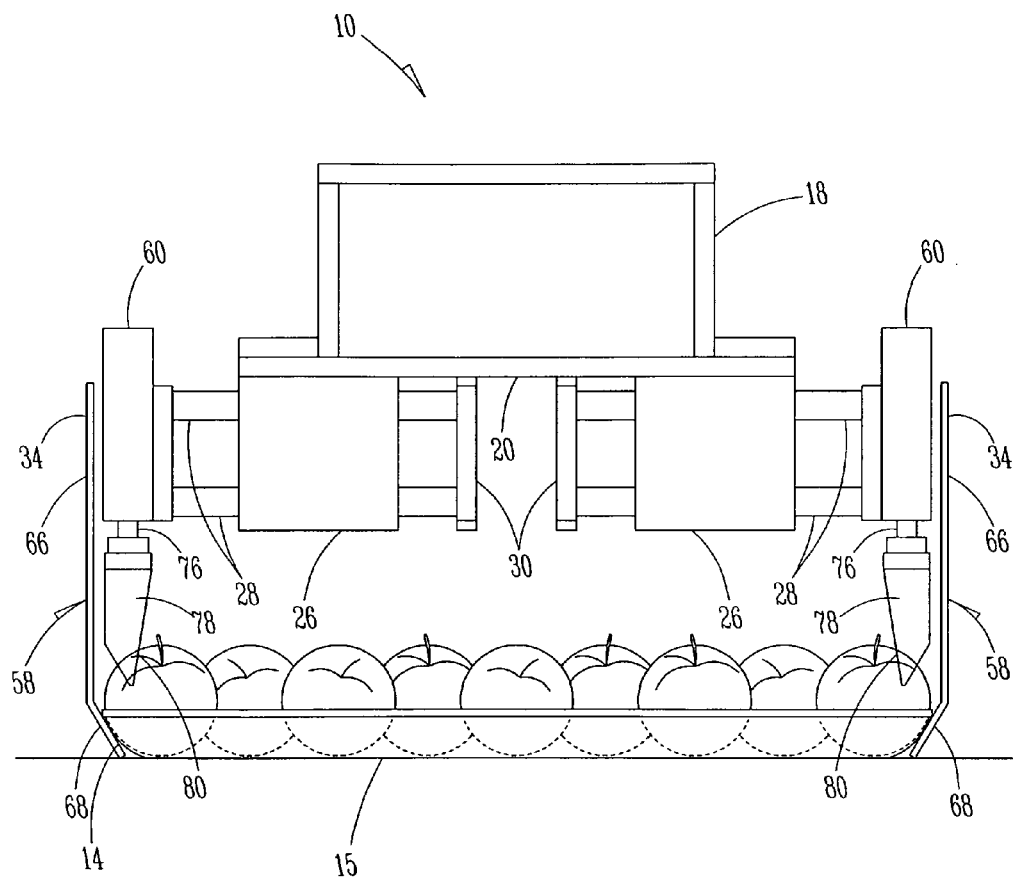
FIG. 8 is a view similar to that of FIG. 7 but showing the tool engaging the outer edges of the tray.

Referring now to FIG. 7, as shown therein, the tool 10 has been moved downwardly from its standby position by the robot 12 so that the clamping end members 34 are positioned on either side of the tray 14. After the tool 10 reaches this position, the powered cylinders 46 of the cylinder assemblies 36 are actuated to extend the rod ends 52 and cause the clamping end members 34 to move inwardly to a first semi-retracted position. As a result, the clamping plates 58 of the end members 34 engage the outer edges of the tray 14 as shown in FIG. 8.

Figure 9:
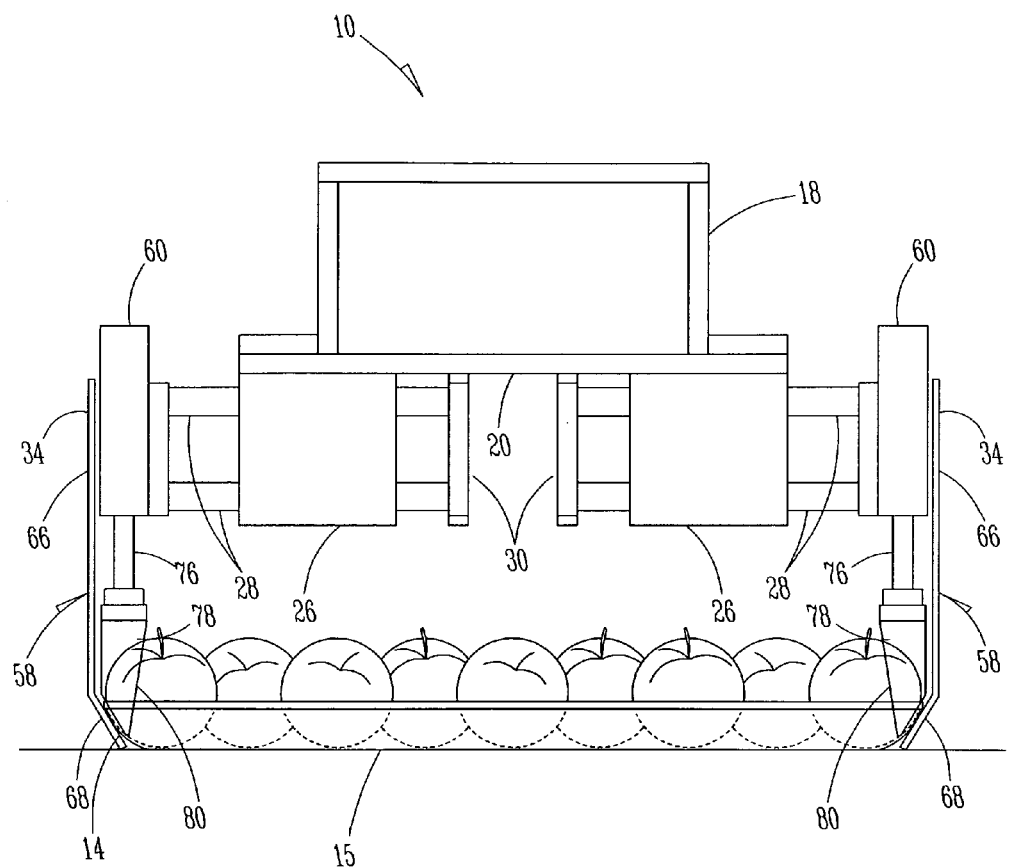
FIG. 9 is a view similar to that of FIG. 8, but showing the tool clamping on to the side edges of the tray.
Figure 10:
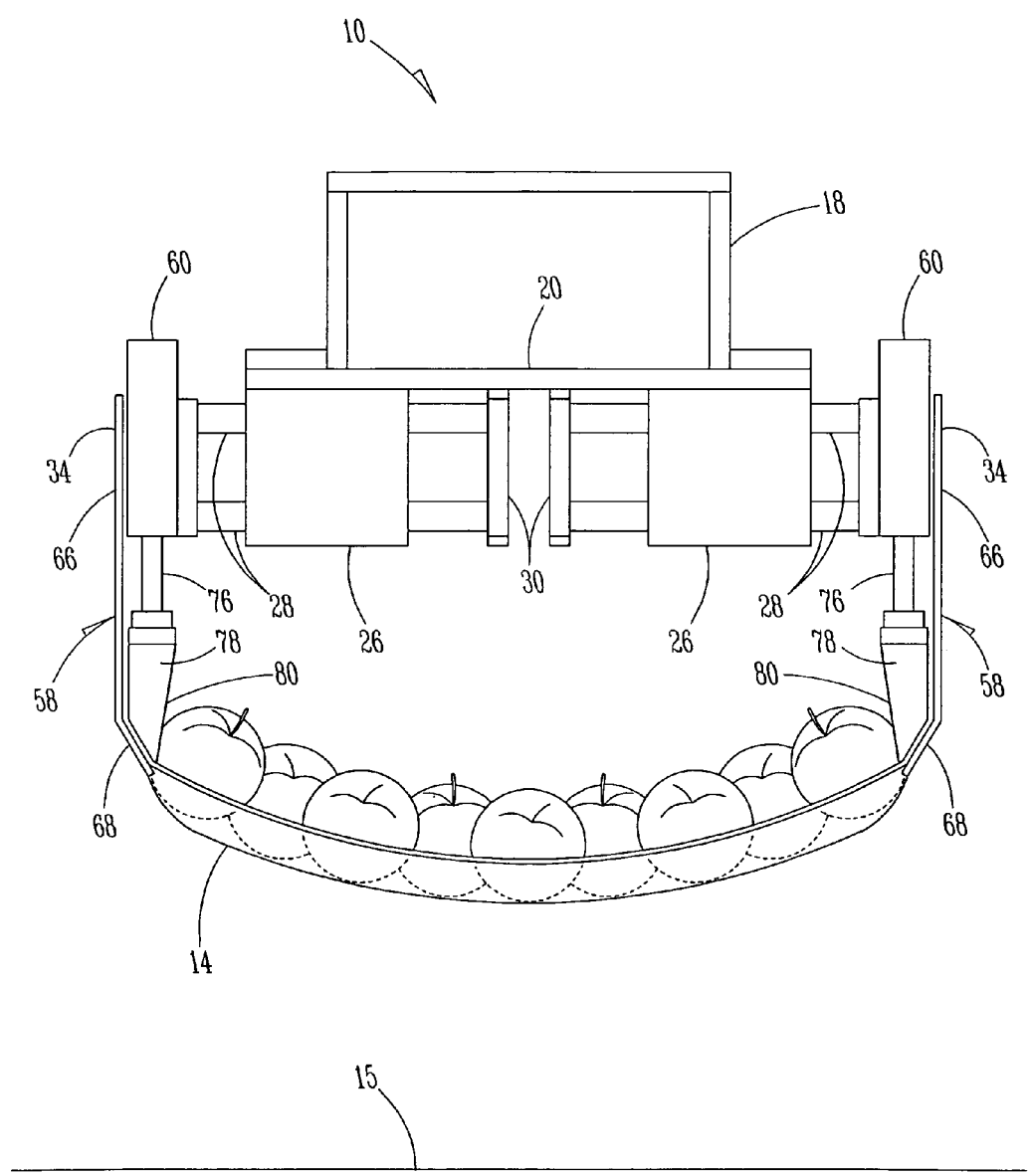
FIG. 10 is a view similar to that of FIG. 9, but showing the tool raising the tray.

With the clamping plates 58 engaging the outer edges of the tray 14, the finger assemblies 60 and 64 are then actuated so that their associated powered cylinders 74 extend their rod ends 76 downwardly. This action causes the lower portions 80 of the clamping fingers 78 to engage the upper portions of the ends of the tray 14 to clamp such ends between the clamping fingers 78 and the clamping plate 58, as shown in FIG. 9.

Figure 11:
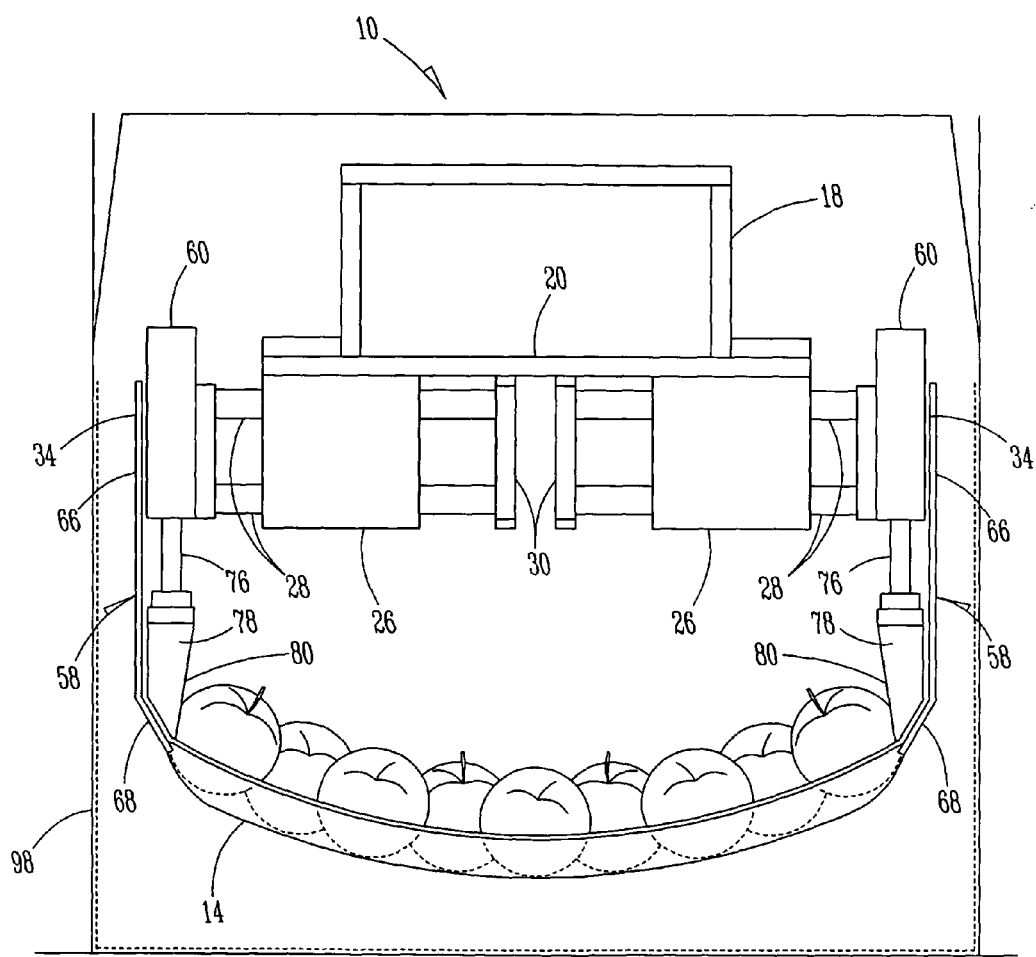
FIG. 11 is a view similar to that of FIG. 10, but showing the tool placing the tray in a packing box.

Next, the end of arm tool 10 is raised upwardly to lift the tray 14 off of the conveyor. Simultaneously, the cylinder assemblies 36 are again actuated to cause the cylinders 44 to extend their rod ends 48 to cause the clamping end members 34 to again move inwardly to a fully retracted position causing the tray 14, due to the weight of the apples therein to bend into a bowed position and reducing the distance between the clamping end members 34. Such reduction insures that the end of arm tool 14 has sufficient clearance for moving the tray 14 into a packing box 98 as shown in FIG. 11. Once the tray 14 is placed into the box 98, the clamping fingers 78 are raised by the cylinders 74 and the tray 14 is disengaged from the tool 10. This sequence of operation is continued until the box 98 is filled with loaded apple trays 14 at which time the box 98 is moved and a new box is moved into place for loading.

Thus, as has been described above, the present invention provides a highly efficient apparatus for picking up trays loaded with apples or other types of fruits, vegetables or materials, and automatically placing them in packing containers prior to shipment. Although the tool 10 has been described with respect to a preferred embodiment, it should be understood that such embodiment may be altered without avoiding the true spirit and scope of the present invention. For example, the powered cylinders described above may be in the form of electrically or hydraulically driven cylinders rather than pneumatically driven as described in the preferred embodiment. Also, other types of arrangements may be employed for providing the movement of the clamping end members 34 to engage the trays 14 to name just a couple of possible variations.

What is claimed is:

1. An end of arm tool for packing article bearing trays in boxes, said tool comprising:
   (a) a tool platform;
   (b) a pair of spaced apart, opposed clamping end members having at least an extended position, a semi-retracted position and a fully retracted position, and each comprising:
      (1) an end plate having a major upper portion that is positioned in a perpendicular relationship to said trays and having a lower portion slanted inwardly at an angle to said upper portion;
      (2) at least two spaced apart powered cylinders mounted on said end plate and having a cylinder rod;
      (3) at least one finger member mounted on the cylinder rod of each of said powered cylinders;
   (c) a pair of cylinder assemblies, each secured to said tool platform and one of said end members and including a powered cylinder apparatus for causing said end members to move first from said extended position to said semi-retracted position for picking up a tray and then to secondly move to said fully retracted position to cause said tray to bend for placing said tray in said box; and
   (d) said finger members are vertically movable by said cylinders from an open position to a closed position adjacent the lower portion of said end plate to clamp one end of said tray therebetween.

2. The end of arm tool as described in claim 1 wherein each of said end members further includes a medial powered cylinder with a cylinder rod located between said spaced apart cylinders and a pair of medial finger members attached to said medial cylinder rod.

3. The end of arm tool as described in claim 2 wherein each of said finger members has a lower end that is slanted at an angle similar to that of said end plate lower portion.

4. The end of arm tool as described in claim 1 wherein each of said cylinder assemblies is formed of:
   (a) two spaced apart bearing blocks each having at least one longitudinal bore extending therethrough;
   (b) an extender rod journaled in each of said bores and having an outer end secured to one of said end members and an inner end;
   (c) a transfer plate secured to and supported by the inner ends of said extender rods; and
   (d) a pair of powered cylinders connected in a series relationship to said transfer plate and actuated in a sequential manner to cause said transfer plate to move and thereby move said end members.

5. An end of arm tool for packing article bearing trays in boxes, said tool comprising:
   (a) a tool platform;
   (b) a pair of spaced apart, opposed clamping end members, each comprising:
      (1) an end plate having an upper portion and a lower portion slanted inwardly with respect to said upper portion;
      (2) at least two spaced apart powered cylinders mounted on said end plate;
      (3) at least one finger member mounted on each of said powered cylinders;
   (c) a pair of cylinder assemblies, each secured to said tool platform and one of said end members and including a powered cylinder apparatus for causing said end member to move from an extended position to a retracted position for engaging one of said trays; and
   (d) said finger members are vertically movable downwardly by said cylinders from an open position to a closed position adjacent the lower portion of said end plate to clamp one end of said tray therebetween.

6. The end of arm tool as described in claim 5 wherein each of said end members further includes a medial powered cylinder located between said spaced apart cylinders and a pair of medial finger members attached to said medial cylinder.

7. The end of arm tool as described in claim 6 wherein each of said cylinder assemblies is formed of:
   (a) two spaced apart bearing blocks each having at least one longitudinal bore extending there through;
   (b) an extender rod journaled in each of said bores and having an outer end secured to one of said end members and an inner end;
   (c) a transfer plate secured to and support by the inner ends of said extender rods; and
   (d) said powered cylinder apparatus is connected to said transfer plate and actuated to cause said transfer plate to move and thereby move said end member.

8. The end of arm tool as described in claim 6 wherein each of said finger members has a lower end that is slanted at an angle similar to that of said end plate lower portion.

* * * * *